United States Patent [19]
Readal et al.

[11] 3,977,963
[45] Aug. 31, 1976

[54] METHOD OF NEGATING THE EFFECTS OF METALS POISONING ON CRACKING CATALYSTS

[75] Inventors: Thomas C. Readal, McCandless Township; Joel D. McKinney, Indiana; Robert A. Titmus, Pittsburgh, all of Pa.

[73] Assignee: Gulf Research & Development Company, Pittsburgh, Pa.

[22] Filed: Apr. 17, 1975

[21] Appl. No.: 568,913

[52] U.S. Cl. .......................... 208/120; 208/48 AA; 208/113; 208/119; 208/251 R; 252/411 R; 252/415; 252/454; 252/464; 252/471
[51] Int. Cl.² .................. C10G 11/04; C10G 9/16; C01B 29/12
[58] Field of Search ......... 208/113, 120, 48, 52 CT; 252/411 R

[56] References Cited
UNITED STATES PATENTS

| | | | |
|---|---|---|---|
| 2,129,693 | 9/1938 | Houdry | 208/119 |
| 2,758,097 | 8/1956 | Doherty et al. | 252/413 |
| 3,206,391 | 9/1965 | Gutberlet et al. | 208/110 |
| 3,264,208 | 8/1966 | Plank et al. | 208/120 |
| 3,297,565 | 1/1967 | Garwood et al. | 208/217 |
| 3,711,422 | 1/1973 | Johnson et al. | 252/414 |

*Primary Examiner*—Delbert E. Gantz
*Assistant Examiner*—G. E. Schmitkons

[57] ABSTRACT

A method of negating the effects of metals poisoning on a cracking catalyst which comprises contacting the catalyst containing metal contaminants with a bismuth or manganese compound.

11 Claims, No Drawings

3,977,963

METHOD OF NEGATING THE EFFECTS OF METALS POISONING ON CRACKING CATALYSTS

BACKGROUND OF THE INVENTION

Catalytic cracking processes are conventionally employed to produce gasoline and light distillate fractions from heavier hydrocarbon feed stocks. Deterioration occurs in the cracking ability of the catalyst attributable to the deposition on the catalyst of metals contained within the charge stock. The deposition of these metals such as nickel and vanadium results in the decrease in production of the gasoline fraction. Additionally, the effect of these contaminant metals when deposited on the catalytic cracking catalyst is to increase coke production and to increase cracking depth as shown by the increase in hydrogen production.

The cracking catalysts to which the method of this invention is applicable are those conventionally employed in the cracking of hydrocarbons boiling substantially above 600°F. (316°C) for the production of motor fuel blending components and light distillates. These catalysts generally contain silica or silica-alumina, such materials frequently being associated with zeolitic materials. These zeolitic materials could be natural occurring or could have been produced by conventional ion exchange methods so as to provide metallic ions which improve the activity of the catalyst. The invention is particularly applicable to molecular sieve zeolitic-modified silica-alumina catalysts.

Examples of cracking catalysts to which the method of this invention is applicable include hydrocarbon cracking catalysts obtained by admixing an inorganic oxide gel with an aluminosilicate and aluminosilicate compositions which are strongly acidic in character as a result of treatment with a fluid medium containing at least one rare earth metal cation and a hydrogen ion or ion capable of conversion to a hydrogen ion. Other cracking catalyst compositions of this invention include those crystalline aluminosilicate zeolites having the mordenite crystal structure.

SUMMARY OF THE INVENTION

Catalysts employed in hydrocarbon cracking processes and containing metal contaminants are contacted with a treating agent selected from the group consisting of bismuth and manganese compounds which are oxides or convertible to the oxide upon calcination. Following the contacting of the catalyst with the treating agent, the catalyst is further treated according to conventional methods such as heating in a regeneration step to an elevated temperature in the presence of a free oxygen-containing gas.

DESCRIPTION OF PREFERRED EMBODIMENTS

The cracking catalyst compositions treated by the process of this invention are those which have been deactivated, at least in part, by the deposition thereon of metal contaminants such as nickel and vanadium, such catalysts having deteriorated to the extent that optimum product yields are no longer obtained. The method of this invention is particularly effective in treating cracking catalyst compositions containing at least 500 ppm nickel equivalent (nickel + 0.2 vanadium) metal contaminants. The method of this invention is generally applicable to cracking catalysts containing up to 5000 ppm nickel equivalent metals and particularly applicable to cracking catalyst compositions containing from 1700 to 3700 ppm nickel equivalent metals.

The treating agents employed are compounds of bismuth and/or manganese. Such compounds are either the oxides or those which are convertible to the oxides upon subjecting the catalyst compositions containing the treating agent to calcination. For example, suitable treating agents include triphenylbismuthine, manganese naphthenate, bismuth nitrate, bismuth trichloride, manganese nitrate and manganese benzoate.

The quantity of the treating agent employed will depend upon the extent of metal contamination of the catalyst. Generally, the treating agent is applied to the catalyst in amounts of less than about 2 mols of bismuth or manganese per mol of metal contaminants on the catalyst. Preferably, the treating agent is applied to the catalyst in an amount in the range from about 0.2 to about 1.5 mol of bismuth or manganese per mol of contaminating metals present on the catalyst.

If the treating agent is applied to the catalyst by incorporation in the feed, the concentration of the treating agent so employed will be dependent upon the metals-contamination content of the feed in addition to the concentration of contaminating metals on the catalyst. Generally, an amount of bismuth or manganese treating agent in the range from about 3 ppm to 3000 ppm, preferably from 100 to 500 ppm, is added to the hydrocarbon feed to the cracking reaction zone.

Contacting the catalyst containing contaminant metals with the treating agent can comprise deposition of the treating agent from a suitable liquid solvent or dispersing agent or any other method which brings the treating agent into contact with the catalyst. Such additional methods include impregnation and dry mixing. A preferred method of contacting the catalyst comprises dissolving the treating agent in a hydrocarbon solvent such as the charge to the catalytic cracking process. For example, triphenyl bismuth and manganese naphthenate can be added directly to the hydrocarbon feed to the catalytic cracking process. Under such conditions contact between the matals contaminated catalyst and the treating agent is effected within the catalytic cracking zone.

Following deposition of the treating agent on the catalyst, the catalyst can be further treated according to conventional methods. These methods involve heating the catalyst to elevated temperatures, generally in the range of about 800° to about 1600°F. (427° to 870°C.) for a period of time ranging from 3 to 30 minutes, in the presence of a free oxygen-containing gas. This further treatment which can be effected in a conventional catalyst regeneration step results in the treating agent, if not presently in the form of the oxide, being converted to the oxide.

The feed stocks employed in the catalytic cracking process of this invention are those which are conventionally utilized in catalytic cracking processes to produce gasoline and light distillate fractions from heavier hydrocarbon feed stocks and generally are those feed stocks having an initial boiling point about 600°F. (316°C.) and include such materials such as gas oils, cycle oils, residuums and the like. The cracking processes employing the treated catalyst compositions of this invention are generally conducted at temperatures between 800° and about 1200°F. (427° and 649°C.) and at pressures within the range of subatmospheric to 3000 psig (210 kg/cm²).

The following example is presented to illustrate preferred embodiments of the invention but the invention is not to be considered as limiting to the specific embodiments presented therein. Three catalytic cracking runs were made with Run No. 1 illustrating conventional operation with a catalyst containing a high concentration of contaminant metals. Run No. 2 was conducted under essentially the same conditions with the exception that bismuth was added to the gas oil feed. Run No. 3 was conducted under essentially the same conditions as Run No. 2 with the exception that manganese had also been added to the gas oil feed.

EXAMPLE

The cracking catalyst composition employed in each of the fluid catalytic cracking process (FCC) runs was a crystalline aluminosilicate dispersed in a refractory oxide matrix. For each run, the concentrations of the metals on the catalyst at the beginning of each run were as follows:

|  | Run No. 1 | Run No. 2 | Run No. 3 |
| --- | --- | --- | --- |
| Nickel, ppm | 2950 | 2925 | 2900 |
| Vanadium, ppm | 750 | 745 | 740 |
| Nickel Equivalent, ppm | 3100 | 3074 | 3048 |
| Bismuth, ppm | 0 | 6050 | 6050 |
| Manganese, ppm | 0 | 0 | 1580 |

Bismuth was added to the catalyst prior to Run No. 2 by injecting triphenylbismuthine in the gas oil charge to the FCC process for a period of eight hours. Manganese was added to the catalyst by injecting manganese naphthenate into the gas oil charge for a period of eight hours prior to conducting Run No. 3. The gas oil feed to the FCC process of each run had the following inspections:

| | | |
| --- | --- | --- |
| Gravity, °API | 25.0 | |
| Sulfur, wt. % | 0.31 | |
| Nitrogen, wt. % | 0.12 | |
| Carbon Residue, Rams, ASTM D525, wt. % | 0.77 | |
| Aniline Point, ASTM D611, °F. | 199 | (93°C) |
| Viscosity, SUS, ASTM D2161, 210°F. (99°C) | 49.8 | |
| Pour Point, ASTM D97, °F. | +90 | (+32°C) |
| Nickel, ppm | 1.2 | |
| Vanadium, ppm | 0.4 | |
| Vacuum Distillation ASTM D1160 °F. | | |
| 10% at 760 mm | 622 | (328°C) |
| 30% | 716 | (380°C) |
| 50% | 797 | (425°C) |
| 70% | 885 | (474°C) |
| 90% | 1,055 | (568°C) |
| Calc. Carbon Type Composition, vol. Fract. | | |
| Aromatics | 0.15 | |
| Naphthenes | 0.26 | |
| Paraffins | 0.59 | |

The gas oil feed was charged continuously to a riser cracker reactor in each of the runs at the following operating conditions:

| | Run No. 1 | | Run No. 2 | | Run No. 3 | |
| --- | --- | --- | --- | --- | --- | --- |
| Feed Preheat Temp., °F. | 516 | (269°C) | 520 | (271°C) | 520 | (271°C) |
| Catalyst Temp. Prior to Feed, °F. | 1197 | (647°C) | 1201 | (649°C) | 1201 | (649°C) |
| Riser Reaction Zone Avg. Temp., °F. | 988 | (531°C) | 990 | (532°C) | 990 | (532°C) |
| Riser Outlet Temp., °F. | 979 | (526°C) | 980 | (527°C) | 980 | (527°C) |
| Riser Pressure, psig | 25.8 (2kg/cm²) | | 26.3 (2kg/cm²) | | 25.8 (2kg/cm²) | |
| Recycle Rate wt. % of Fresh Feed | 9.4 | | 8.9 | | 8.7 | |
| Catalyst to Oil Ratio, wt. of catalyst/wt. Fresh Feed | 9.4 | | 9.2 | | 9.2 | |
| Contact Time, based on Feed, SEC. | 8.72 | | 8.78 | | 8.61 | |

During the runs, the catalyst was regenerated employing the following operating conditions:

| | | | |
| --- | --- | --- | --- |
| Regenerator Temp., °F. | 1258 (681°C) | 1251 (677°C) | 1243 (673°C) |
| Air Rate, SCF/HR | 40.0 (1133L/HR) | 40.1 (1134L/HR) | 40.4 (1135L/HR) |
| Flue Gas Rate, SCF/HR | 56.2 (1592L/HR) | 55.6 (1575L/HR) | 55.1 (1559L/HR) |
| Flue Gas Analysis, Mol % | | | |
| Nitrogen | 86.1 | 86.0 | 87.0 |
| Oxygen | 1.5 | 1.5 | 1.5 |
| Carbon Dioxide | 8.7 | 9.6 | 9.0 |
| Carbon Monoxide | 4.2 | 3.1 | 2.8 |
| Hydrogen | 0.0 | 0.0 | 0.0 |
| Sulfur Dioxide | 0.0 | 0.0 | 0.0 |
| Hydrogen Sulfide | 0.0 | 0.0 | 0.0 |
| Water | 0.0 | 0.0 | 0.0 |
| $CO_2/CO$ Mol Ratio | 2.1 | 3.1 | 3.2 |

The product yields, based upon volume percent of fresh feed, during each of the runs were as follows:

|  | Run No. 1 | Run No. 2 | Run No. 3 |
|---|---|---|---|
| Slurry Oil [650+ °F. (343+ °C) TBP] | 2.3 | 2.1 | 2.1 |
| Furnace Oil [650 °F. (343°C) TBP EP] | 12.1 | 12.2 | 12.1 |
| Debut. Gaso. [430 °F. (221°C) TBP EP] | 61.7 | 62.9 | 63.7 |
| Depent. Gaso. [430 °F. (221°C) TBP EP] | 48.5 | 49.1 | 49.8 |
| Heavy Gasoline [430 °F. (221°C) TBP EP] | 27.1 | 26.6 | 26.2 |
| Depentanized Light Gasoline | 21.4 | 22.5 | 23.6 |
| Total Pentanes + Pentenes | 13.2 | 13.8 | 13.9 |
| I-Pentane | 6.7 | 7.3 | 7.4 |
| N-Pentane | 0.9 | 0.9 | 0.9 |
| Pentenes | 5.6 | 5.6 | 5.6 |
| Total Butanes + Butenes | 19.6 | 19.7 | 20.2 |
| I-Butane | 7.0 | 7.3 | 7.4 |
| N-Butane | 1.7 | 1.8 | 1.9 |
| Butenes | 10.9 | 10.6 | 10.9 |
| Total Propane + Propylene | 11.8 | 11.7 | 12.0 |
| Propane | 2.4 | 2.3 | 2.4 |
| Propylene | 9.4 | 9.4 | 9.6 |
| Total $C_3$ + Liquid Yield | 107.5 | 108.6 | 110.1 |

Additionally, the coke and hydrogen yields for each of the three runs are as shown below:

| Coke, wt. % | 10.9 | 10.5 | 9.5 |
|---|---|---|---|
| Hydrogen, wt. % | 0.54 | 0.43 | 0.38 |

From the above, it is apparent that gasoline yield was increased significantly by the addition of bismuth (1.2 vol. %) and that coke and hydrogen yields were reduced by the bismuth addition (0.4 and 0.11 wt. %, respectively), giving a 1.1 volume percent gain in liquid recovery. The yield data demonstrates that the addition of manganese resulted in further improvement in product distribution. The gasoline yield was further increased by 0.8 volume percent and coke and hydrogen yields were further reduced by 1.0 and 0.05 weight percent, respectively. The data also indicates that there was a further 1.5 volume percent increase in liquid recovery.

We claim:

1. In a process which comprises contacting a hydrocarbon feed boiling above 600°F. with a cracking catalyst containing metal contaminants under cracking conditions without added hydrogen to produce a gasoline fraction; the improvement which comprises contacting said catalyst with a treating agent selected from the group consisting of bismuth, bismuth oxide, and compounds convertible to bismuth oxide so as to deposit bismuth on said catalyst, and thereafter heating the bismuth-containing catalyst to a temperature in the range of about 800° to about 1600°F.

2. The process of claim 1 wherein said catalyst is a zeolite-containing catalyst.

3. The process of claim 2 wherein said catalyst is contacted with said treating agent so as to deposit on said catalyst a concentration of bismuth in the range from about 0.2 to about 1.5 mol per mol of contaminating metals present on the catalyst.

4. In a process which comprises contacting a hydrocarbon feed boiling above 600°F. with a cracking catalyst containing metal contaminants under cracking conditions without added hydrogen to produce a gasoline fraction; the improvement which comprises incorporating into the hydrocarbon feed to the cracking zone a treating agent selected from the group consisting of bismuth, manganese, oxides of bismuth and manganese, and compounds convertible to bismuth and manganese oxides, contacting in said cracking zone said catalyst with said treating agent under conditions so as to deposit on said catalyst a concentration of bismuth or manganese in the range from about 0.2 to about 1.5 mol per mol of contaminating metals present on the catalyst, and thereafter heating said catalyst to a temperature in the range of about 800° to about 1600°F.

5. The process of claim 4 in which said catalyst is a zeolite-containing catalyst.

6. The process of claim 5 wherein said catalyst is heated to a temperature in the range of about 800° to about 1600°F. for a period of time ranging from 3 minutes to 30 minutes.

7. The process of claim 6 wherein said cracking catalyst is initially contacted with a treating agent selected from the groups consisting of bismuth, bismuth oxide and compounds convertible to bismuth oxide, and thereafter contacted with a treating agent selected from the group consisting of manganese, manganese oxide and compounds convertible to manganese oxide.

8. The process of claim 3 wherein said cracking conditions include a temperature between 800° and about 1200°F. and a pressure up to 3,000 psig.

9. The process of claim 6 wherein said cracking conditions include a temperature between 800° and about 1200°F. and a pressure up to 3,000 psig.

10. The process of claim 6 in which the treating agent is incorporated into said hydrocarbon feed in an amount ranging from 3 ppm to 3000 ppm.

11. The process of claim 6 in which said catalyst contains from 1700 to 3700 ppm nickel equivalent metal contaminants.

* * * * *